(12) United States Patent
Carbajal et al.

(10) Patent No.: US 12,083,772 B2
(45) Date of Patent: Sep. 10, 2024

(54) COVER WINDOW ASSEMBLY, RELATED ARTICLES AND METHODS

(71) Applicant: DUPONT ELECTRONICS, INC., Wilmington, DE (US)

(72) Inventors: Leopoldo Alejandro Carbajal, Newark, DE (US); Mark Allan Lamontia, Landenberg, PA (US); Mobin Yahyazadehfar, Garnet Valley, PA (US); Aref Samadidooki, Wilmington, DE (US)

(73) Assignee: DUPONT ELECTRONICS, INC., Wilmington, DE (US)

( * ) Notice: Subject to any disclaimer, the term of this patent is extended or adjusted under 35 U.S.C. 154(b) by 29 days.

(21) Appl. No.: 17/776,480

(22) PCT Filed: Nov. 18, 2020

(86) PCT No.: PCT/US2020/060964
§ 371 (c)(1),
(2) Date: May 12, 2022

(87) PCT Pub. No.: WO2021/108174
PCT Pub. Date: Jun. 3, 2021

(65) Prior Publication Data
US 2022/0388288 A1    Dec. 8, 2022

Related U.S. Application Data

(60) Provisional application No. 62/942,094, filed on Nov. 30, 2019.

(51) Int. Cl.
| | | |
|---|---|---|
| *B32B 27/08* | (2006.01) | |
| *B32B 7/022* | (2019.01) | |
| *B32B 7/12* | (2006.01) | |
| *G02B 1/14* | (2015.01) | |
| *G09F 9/30* | (2006.01) | |

(52) U.S. Cl.
CPC .............. *B32B 27/08* (2013.01); *B32B 7/022* (2019.01); *B32B 7/12* (2013.01); *G02B 1/14* (2015.01); *B32B 2250/05* (2013.01); *B32B 2250/24* (2013.01); *B32B 2250/44* (2013.01); *B32B 2255/102* (2013.01); *B32B 2255/26* (2013.01); *B32B 2274/00* (2013.01); *B32B 2307/412* (2013.01); *B32B 2307/51* (2013.01); *B32B 2307/536* (2013.01); *B32B 2307/54* (2013.01); *B32B 2307/558* (2013.01); *B32B 2307/734* (2013.01); *B32B 2457/20* (2013.01); *G09F 9/301* (2013.01)

(58) Field of Classification Search
CPC .. B32B 7/00–7/14; B32B 27/00–27/42; G02B 1/00–1/18
See application file for complete search history.

(56) References Cited

U.S. PATENT DOCUMENTS

| | | | |
|---|---|---|---|
| 6,383,644 | B2 | 5/2002 | Fuchs |
| 9,018,343 | B2 | 4/2015 | Park et al. |
| 9,580,555 | B2 | 2/2017 | Ju et al. |
| 9,645,613 | B2 | 5/2017 | Nam et al. |
| 9,758,630 | B2 | 9/2017 | Kon et al. |
| 9,780,318 | B2 | 10/2017 | Johnson et al. |
| 9,865,844 | B1 * | 1/2018 | Park ................. H10K 50/86 |
| 10,005,264 | B2 | 6/2018 | Leatherdale et al. |
| 10,093,074 | B2 | 10/2018 | Nam et al. |
| 10,331,172 | B2 | 6/2019 | Oh et al. |
| 10,347,700 | B2 | 7/2019 | Yang et al. |
| 11,332,559 | B2 | 5/2022 | Song et al. |
| 2008/0145632 | A1 | 6/2008 | Nagami |
| 2009/0208715 | A1 | 8/2009 | Stowell et al. |
| 2013/0177748 | A1 | 7/2013 | Hirai et al. |
| 2014/0030462 | A1 | 1/2014 | Sullivan |
| 2017/0087807 | A1 * | 3/2017 | Lee ..................... B32B 7/12 |
| 2017/0364029 | A1 * | 12/2017 | Cho ............... G02F 1/133305 |
| 2017/0369654 | A1 | 12/2017 | Kao et al. |
| 2018/0063980 | A1 | 3/2018 | Shin et al. |
| 2018/0123083 | A1 | 5/2018 | Im et al. |
| 2018/0134007 | A1 | 5/2018 | Lee et al. |
| 2019/0143638 | A1 * | 5/2019 | Park ................... B32B 27/304 |
| | | | 361/820 |
| 2019/0185602 | A1 | 6/2019 | Bu et al. |
| 2019/0185633 | A1 | 6/2019 | Mulzer et al. |
| 2019/0185710 | A1 | 6/2019 | Mulzer et al. |
| 2019/0238171 | A1 | 8/2019 | McGuire, Jr. |
| 2021/0017308 | A1 * | 1/2021 | Song ..................... C08F 20/34 |
| 2021/0193942 | A1 * | 6/2021 | Akkerman ............ B32B 27/281 |

FOREIGN PATENT DOCUMENTS

| | | | | |
|---|---|---|---|---|
| EP | 3288096 A1 * | 2/2018 | ............ | B32B 27/08 |
| KR | 20150072901 A * | 6/2015 | | |
| WO | 2018/130289 A1 | 7/2018 | | |

OTHER PUBLICATIONS

"A Guide to Silane Solutions from Dow Corning". Dow Corning, (2005); pp. 1-31.*
Machine translation of KR20150072901. Retrieved Jan. 31, 2024.*

* cited by examiner

*Primary Examiner* — Prashant J Khatri

(57) ABSTRACT

The present invention is directed to a cover window assembly comprising a multi-layer films of polymeric and inorganic materials for a variety of articles, and the related articles and methods. The cover window assembly exhibits high resistance to strain and impact damage for the articles including display devices, particularly flexible display devices.

14 Claims, No Drawings

COVER WINDOW ASSEMBLY, RELATED ARTICLES AND METHODS

FIELD

The present invention is directed to a cover window assembly comprising a multi-layer films of polymeric and inorganic materials for a variety of articles, and the related articles and methods. The cover window assembly exhibits high resistance to strain, and surface and impact damage for the articles including display devices, particularly flexible display devices.

BACKGROUND

Multi-layer polymeric films are applied to an article surface for protecting the article from damage during the use of the article. The applications of the multi-layer polymeric films are becoming increasingly desirable as widespread use of consumer electronic devices soars. The consumer electronic devices include mobile phones, PDAs, desktop, laptop and notebook computers, and LCD and plasma televisions.

Displays used in various electronic devices, such as mobile devices, often have a cover window for protection, such as protection against scratches, fingerprints, damage from impacts, and the like. Such cover windows are optically clear films and are attached to the display substrate using an optically clear adhesive.

Conventional wisdom in the field of flexible display devices provides that harder and harder cover windows are needed to provide increased levels of protection of the devices. Such conventional wisdom also provides that the flexible display devices should be relatively soft and flexible. Despite cover windows of increasing hardness and having the desired flexibility, damage to displays remains a significant problem, particularly in the field of mobile displays. The emerging field of flexible displays provides an even greater concern as the displays must also be capable of folding, in addition to providing protection against scratches, fingerprints, damage from impacts, and the like. The flexible displays need significantly reduced cover window thickness and rigidity but also feature bendability/flexibility. In addition, display manufacturers constantly search for an effective impact resistance material that can be used to protect sensitive electronic components beneath the cover windows of the display devices. There remains a need in the art for new cover windows, and methods that provide improved protection for display touch screens, particularly in the field of flexible displays.

DETAILED DESCRIPTION

As used throughout this specification, the following abbreviations shall have the following meanings, unless the context clearly indicates otherwise: ° C.=degree Celsius; g=gram; nm=nanometer; μm=micron=micrometer; mm=millimeter; sec.=second; and min.=minutes. All amounts are percent by weight ("wt %") and all ratios are molar ratios, unless otherwise noted. All numerical ranges are inclusive and combinable in any order, except where it is clear that such numerical ranges are constrained to added up to 100%. Unless otherwise noted, all polymer and oligomer molecular weights are weight average molecular weights ('Mw") with unit of g/mol or Dalton, and are determined using gel permeation chromatography compared to polystyrene standards.

The articles "a", "an" and "the" refer to the singular and the plural, unless the context clearly indicates otherwise. As used herein, the term "and/or" includes any and all combinations of one or more of the associated items. "Curable" refers to any material capable of being cured under the conditions of use. The terms "film" and "layer" are used interchangeably through this specification. A layer can be one layer or plurality of layers having the same physical properties but different polymeric compositions. The term "(meth)acrylate" refers to any of a "methacrylate", an "acrylate'" and combinations thereof. The term "polymer" refers to molecules composed of repeating monomer units. The term "copolymer" refers to a polymer composed of two or more different monomers as polymerized units, and includes terpolymers, tetrapolymers, and the like. Polymers and copolymers in the present invention may contain organic and/or inorganic additives.

It will be understood that although the terms first, second, third, etc. may be used herein to describe various elements, components, regions, layers and/or sections, these elements, components, regions, layers, and/or sections should not be limited by these terms. These terms are only used to distinguish one element, component, region, layer and/or section from another element, component, region, layer and/or section. Thus, a first element, component, region, layer and/or section could be termed a second element, component, region, layer and/or section without departing from the teachings of the present invention. Similarly, the terms "top" and "bottom" are only relative to each other. It will be appreciated that when an element, component, layer or the like is inverted, what is the "bottom" before being inverted would be the "top" after being inverted, and vice versa. When an element is referred to as being "on" or "disposed on" another element, it means positioning on or below the object portion, but does not essentially mean positioning on the upper side of the object portion based on a gravity direction, and it can be directly on the other element or intervening elements may be present therebetween. In contrast, when an element is referred to as being "directly on" or "disposed directly on" another element, there are no intervening elements present.

Further, it will also be understood that when one element, component, region, layer and/or section is referred to as being "between" two elements, components, regions, layers and/or sections, it can be the only element, component, region, layer and/or section between the two elements, components, regions, layers and/or sections, or one or more intervening elements, components, regions, layers and/or sections may also be present.

The terms "flexible", "fold", "folding", "foldable" "bend", "bending" and "bendable" mean that a matter can be flexed, folded, bent, rolled, crooked, or curved; and are used interchangeably through this specification. The term 'infolding", "inner folding", or "inward folding" refers to a configuration in which display surfaces of different regions are folded so as to face each other. The term 'outfolding", "outer folding", or "outward folding" refers to a configuration in which display surfaces of different regions are folded so as to be oriented towards outside.

"Transparent layer" refers to a layer that has a high light transmission (typically greater than 90%) over at least a portion of the surface of the substrate over at least a portion of the light spectrum with wavelengths of about 350 to about 1,600 nanometers, including the visible light spectrum (wavelengths of about 380 to about 750 nanometers).

The term "yield stress" is defined in ASTM D638-14. The yield stresses specified in the present application are determined according to the method in ASTM D638-14 using an offset value of 0.2%.

The present invention provides a cover window assembly comprising one or more multi-layer films of polymeric and/or inorganic materials. The layers of polymeric and/or inorganic materials can include an energy-dispersing layer, an elastomer layer, a structural layer, a hard coat layer, an oxide layer or their combinations. An adhesive layer can be used between any two layers to enhance the mechanical properties of the cover window assembly. All the layers in the cover widow assembly are transparent layers.

An energy-dispersing layer can have an elastic modulus greater than 0.05 GPa, or greater than 0.5 GPa, or greater than 2.0 GPa; and a yield stress less than 110 MPa, or less than 80 MPa, or less than 40 MPa. Thickness of an energy-dispersing layer can be in a range of from 10 to 400 µm, of from 25 to 400 µm, or from 25 to 350 µm, or from 25 to 300 µm, or from 25 to 250 µm. Polymeric materials capable of being used as the energy-dispersing layer are not particularly limited, so long as the materials satisfy such physical properties as described above. Examples of the polymeric material used as the energy-dispersing layer can include, but are not limited to, polyimide, polyimide-polyamide, polyamide, polyethersulfone, cyclic olefin copolymer, polyesterimide, polycarbonate, polyester, polyurethane, poly(meth)acrylate, polyurethane-(meth)acrylate, or a combination thereof.

In one embodiment, the energy-dispersing layer can comprise a curable composition comprising (a) one or more urethane (meth)acrylate oligomers; (b) one or more mono- or di-(meth)acrylate; (c) one or more (meth)acrylate cross-linkers having three or more (meth)acrylate moieties; and (d) one or more photoinitiators. The energy-dispersing layer can then be obtained from polymerizing and curing the composition. Such compositions and the resulting energy-dispersing layers are disclosed in U.S. patent application Ser. No. 16/909,067, the entire contents of which are incorporated herein by reference.

An elastomer layer can have an elastic modulus of from 1 to 50 MPa, or from 1 to 30 MPa, or from 1 to 20 MPa, or from 1 to 10 MPa; and a Poisson's ratio of at least 0.4, or at least 0.46, or at least 0.48. The elastomer layer can have a thickness of from 1 to 600 µm, or from 3 to 600 µm, or from 5 to 600 µm, or from 10 to 600 µm, or from 15 to 600 µm, or from 20 to 600 µm, or from 25 to 600 µm, or from 25 to 550 µm, or from 25 to 500 µm, or from 25 to 450 µm, or from 25 to 400 µm. Polymeric materials capable of being used as the elastomer layer are not particularly limited, so long as the materials satisfy such physical properties as described above. Examples of the polymeric material used as the elastomer layer can include, but are not limited to, silicone, polyurethane, polyurethane acrylate, styrene butadiene rubber (SBR), ethylene vinyl acetate (EVA) polymers, polyether block amide (PEBA), polyacrylic acid, fluorosilicone, polyvinyl alcohol, polyetherimide, polystyrene, polyvinyl acetate, polycarbonate-urethane(meth)acrylate (PCUA), or a combination thereof.

A structural layer can have an elastic modulus of at least 3 GPa, or at least 4 GPa, or at least 6 GPa. The structural layer can have a thickness of from 10 to 150 µm, or from 10 to 120 µm, or from 10 to 100 µm, or from 20 to 80 µm, or from 25 to 80 µm, or from 30 to 70 µm, or from 40 to 60 µm. Polymeric materials capable of being used as the structural layer are not particularly limited, so long as the materials satisfy such physical properties as described above.

Examples of the polymeric material used as the structural layer can include, but are not limited to, polyimide, polyimide-polyamide, polyamide, polyethersulfone, polyethylene terephthalate (PET), polyetherketone, cyclic olefin copolymer, polyesterimide, polycarbonate, polymethyl methacrylate, or combinations thereof.

In one embodiment, the structural layer can be a polyimide film. The polyimide film can be made from polymerizing a dianhydride and a diamine in a solvent to obtain a polyamic acid solution, imidizing the polyamic acid solution to form a substantially imidized solution and casting the imidized solution. The dianhydride can be selected from the group consisting of 3,3',4,4'-biphenyltetracarboxylic dianhydride (BPDA), 4,4'-(hexafluoroisopropylidene)diphthalic anhydride (6FDA), cyclobutane-1,2,3,4-tetracarboxylic dianhydride (CBDA), 3,3',4,4'-benzophenonetetracarboxylic dianhydride, 3,3',4,4'-diphenylsulfonetetracarboxylic dianhydride, an alicyclic dianhydride and combinations thereof. The diamine can be a fluorinated aromatic diamine such as 2,2'-bis(trifluoromethyl)-4,4'-diamino biphenyl (TFMB). The diamine can also be an aliphatic amine selected from the group consisting of 1,2-diamninoethane, 1,6-diaminohexane, 1,4-diaminobutane, 1,5-diaminopentane, 1,7-diaminoheptane, 1,8-diaminooctane, 1,9-diaminononane, 1,10-diaminodecane, 1,11-diaminoundecane, 1,12-diaminododecane, 1,16-hexadecamethylenediamine, 1,3-bis(3-aminopropyl)-tetramethyldisiloxane, isophoronediamine, bicyclo[2.2.2]octane-1,4-diamine and combinations thereof. The polyimide film and preparation are disclosed in U.S. patent application Ser. No. 16/912,654, the entire contents of which are incorporated herein by reference.

In another embodiment, the structural layer can be a polyamide-imide film. The polyamide-imide film comprises a copolymer derived from an aromatic dianhydride, an aromatic diamine and an aromatic dicarbonyl compound. The aromatic dianhydride can be selected from the group consisting of 3,3',4,4'-biphenyltetracarboxylic dianhydride (BPDA), 4,4'-(hexafluoroisopropylidene)diphthalic anhydride (6FDA), cyclobutane-1,2,3,4-tetracarboxylic dianhydride (CBDA), cyclopentanetetracarboxylic dianhydride (CPDA), and combinations thereof. The aromatic diamine can be a fluorinated aromatic diamine such as 2,2'-bis (trifluoromethyl)-1,1'-biphenyl-4,4'-diamine (TFDB). The aromatic dicarbonyl compound can be selected from the group consisting of p-terephthaloyl chloride (TPC), terephthalic acid, iso-phthaloyl dichloride, and 4,4'benzoyl chloride. The polyamide-imide film and preparation are disclosed in U.S. Pat. Nos. 9,018,343 and 9,580,555, the entire contents of which are incorporated herein by reference.

A hard coat layer can be made from an organic material, an inorganic material, an organic/inorganic hybrid material, or a combination thereof. Examples of the organic material can include, but are not limited to, epoxy-siloxane resin, silicone, poly(meth)acrylate, polyurethane-(meth)acrylate, polyurethane, epoxy, and combinations thereof. The inorganic materials can include, but are not limited to, silica, alumina, or zirconia. The organic/inorganic hybrid material can be polysilsesqiuoxane.

In one embodiment, the hard coat layer can be produced from a hard coating composition containing an epoxy-siloxane oligomer, organic particles having an average diameter of 50 to 250 nm and a reactive carrier having one or more epoxy or oxetane moieties. The compositions and the resulting hard coat layers are disclosed in U.S. Patent Application Publication No. 2019/0185710, the entire contents of which are incorporated herein by reference.

In another embodiment, the hard coat layer can be produced from a hard coating composition comprising siloxane oligomer or siloxane oligomer with nano particles of silica or a metal oxide. The compositions and hard coat layers are disclosed in U.S. Patent Application Publication Nos. 2017/0369654 and 2019/0185633, the entire contents of which are incorporated herein by reference.

In yet another embodiment, the hard coat layer can comprise polyurethane-(meth)acrylate made from an ultraviolet curable acrylic composition. The composition can comprise aliphatic tri-, tetra-, or penta-functional (meth) acrylate monomer, an acrylate monomer containing isocyanurate group, a urethane (meth)acrylate oligomer and a UV radical initiator. The compositions and hard coat layers are disclosed in U.S. Patent Application Publication No. 2019/0185602, the entire contents of which are incorporated herein by reference.

In some embodiments, one hard coat layer can comprise at least two hard coat layers. The hard coat layer can have a thickness of from 0.1 to 200 μm, or from 0.5 to 150 μm, or from 1 to 100 μm, or from 1 to 50 μm, or from 1 to 30 μm, or from 1 to 20 μm, or from 1 to 10 μm, or from 1 to 6 μm, or from 2 to 50 μm, or from 3 to 50 μm, or from 3 to 30 μm, or from 3 to 15 μm, or from 5 to 50 μm, or from 5 to 25 μm, or from 10 to 50 μm, or from 10 to 35 μm, or from 15 to 50 μm, or from 15 to 30 μm.

The hard coat layer can have a high modulus and hardness. The hard coat layer can have a pencil hardness at least 2H, or at least 3H, or at least 4H, or at least 5H, or at least 6H, or at least 7H, or at least 8H, or at least 9H. The pencil hardness is measured with a hard coat layer disposed on glass. The hard coat layer has a nanoindentation modulus of at least 3 GPa, or at least 4 GPa, or at least 8 GPa.

The oxide layer can be semiconducting inorganic compounds, including silicon oxide, silicon oxycarbide, silicon nitride, silicon carbide, aluminum oxide, indium tin oxide, indium doped zinc oxide, zinc oxide, indium oxide, tin oxide, aluminum doped zinc oxide, magnesium-indium oxide, nickel-tungsten oxide, titanium dioxide, tantalum oxide, niobium oxide, molybdenum oxide, iron oxide, chromium oxide, indium gallium oxide, gallium indium zinc oxide, carbon, or a combination thereof. The oxide layer can have a thickness of at least 0.1 μm, at least 0.2 μm, or at least 0.5 μm, or at least 1.0 μm.

The adhesive layer may include an optically clear adhesive (OCA), an optical clear resin (OCR), a pressure sensitive adhesive (PSA), or the like. The adhesive layer may be formed in a film-like shape that may be adhered using a thermal or compressing process using silicone, silicone-(meth)acrylate, silicone-epoxy, polyurethane-(meth)acrylate, poly(meth)acrylate, ethylene vinyl acetate (EVA), polydimethylsiloxane (PDMS), polyurethane (PU), vinyl ether polymers, epoxy, or the like. However, the adhesive layer is not limited thereto. The adhesive layer may be formed of a single material or two or more kinds of materials. In one embodiment, the adhesive layer may comprise a polymer having a glass transition temperature ($T_g$) less than −30° C. or higher than 80° C. In some embodiments, the adhesive layer can be replaced by an elastomer layer between the layers in the cover window assembly of the present invention. Thickness of the adhesive layer can be varied from 1 to 200 μm, or from 1 to 100 μm, or from 1 to 50 μm, or from 3 to 50 μm, or from 5 to 50 μm, or from 5 to 40 μm, or from 5 to 30 μm, or from 10 to 30 μm.

Optionally, a primer coating composition or a primer layer can be applied to any layer or some layer(s) in the cover window assembly of the present invention. The primer layer can comprise polyurethane-acrylate, polyurethane, maleimine-resin, acrylamide polymer, vinyl ether polymers, thiol-isocyanate polymers, silicone, or a combination thereof. Examples of the primer commercially available can include, but are not limited to, Rhoplex™ 3208 (The Dow Chemical Company), Dynol™ 604 (Evonik Corporation), and their combinations. In one embodiment, the polyurethane can be made from blocked aliphatic isocyanate polymer resin with polyalcohol. The primer layer can have a thickness of less than 20 μm, or less than 15 μm, or less than 10 μm, or less than 5 μm, or less than 3 μm, or less than 1 μm.

A cover window assembly of the present invention can comprise a mono-layer or a multi-layer films of polymeric and inorganic materials as described above and their combinations based on unique designs to meet the specific requirements of cover window for display devices. The thickness of each layer in the present invention can be determined based on the specific requirement of mechanical and optical properties of the cover window assembly. The cover window assembly of the present invention can protect the display devices from dropping impact of hard force while maintaining optical properties and scratch resistance to the display devices. In addition, the cover window assembly is optically transparent and colorless.

According to the exemplary embodiments described below, a cover window assembly can comprise a first energy-dispersing layer having a top surface and a bottom surface.

In a first aspect, the cover window assembly can further comprise a first elastomer layer. In one embodiment, the first elastomer layer can be disposed on the top surface of the first energy-dispersing layer. A structural layer can further be disposed on the first elastomer layer. In another embodiment, the first elastomer layer can be disposed on the bottom surface of the first energy-dispersing layer to form a two-layer structure. Two such structures can be stacked together to form another new cover window assembly. Alternatively, a first structural layer can be disposed on the first energy-dispersing layer. Furthermore, a second energy-dispersing layer can be disposed on the first elastomer layer. In addition, a second structural layer can further be disposed on the second energy-dispersing layer. In yet another embodiment, a second elastomer layer can be disposed on the top surface of the first energy-dispersing layer of the cover window assembly comprising the first energy-dispersing layer and the first elastomer layer.

In a second aspect, a cover window assembly comprising a first energy-dispersing layer can further comprise a first structural layer disposed on the first energy-dispersing layer and the first structural layer has a higher yield stress than the first energy-dispersing layer. In one embodiment, the first structural layer can be disposed on the top surface of the first energy-dispersing layer to form a two-layer structure. Two such structures can be stacked together to form another new cover window assembly. Furthermore, an elastomer layer can be disposed between the two-layer structures. Alternatively, a first hard coat layer or a first oxide layer can also be disposed on the first structural layer on the two-layer structure. Alternatively, a second energy-dispersing layer can be disposed on the structural layer of the two-layer structure.

In another embodiment, the first structural layer can be disposed on the bottom surface of the first energy-dispersing layer. A hard coat layer or an oxide layer can further be disposed on the first energy-dispersing layer on this cover window assembly. Alternatively, a second structural layer can be disposed on the first energy-dispersing layer on this window assembly.

In a third aspect, a cover window assembly comprising a first energy-dispersing layer can further comprise a first hard coat layer or a first oxide layer. In one embodiment, the first hard coat layer is disposed on the first energy-dispersing layer. In another embodiment, the first oxide layer is disposed on the first energy-dispersing layer. In yet another embodiment, the first hard coat layer is disposed on the first energy-dispersing layer and the first oxide layer is disposed on the first hard coat layer. In yet another embodiment, the first oxide coat layer is disposed on the first energy-dispersing layer and the first hard coat layer disposed on the first oxide layer.

In some embodiments, a cover window assembly comprising a first energy-dispersing layer and a first hard coat layer or a first oxide layer can further comprise a first structural layer disposed on the first hard coat layer or the first oxide layer. A second hard coat layer or a second oxide layer can further be disposed on the first structural layer for this cover window assembly. Furthermore, in one embodiment, a second structural layer can be disposed on the first energy-dispersing layer.

Furthermore, in another embodiment, an adhesive layer can be disposed between the first structural layer and the first hard coat or the first oxide layer for this cover window assembly. Alternatively, an adhesive layer is disposed on the first energy-dispersing layer and is subsequently adhered to a second energy-dispersing layer. In addition, a second structural layer is disposed on the second energy-dispersing layer. Alternatively, a second structural layer can be disposed between the adhesive layer and the second energy-dispersing layer.

In some embodiments, a cover window assembly comprising an energy-dispersing layer, a structural layer disposed on the energy-dispersing layer, and a first hard coat layer or a first oxide layer disposed on the structural layer, in one embodiment, can further comprise an elastomer layer disposed on the energy-dispersing layer. In another embodiment, an elastomer layer is disposed between the structural layer and the energy-dispersing layer. Furthermore, a second hard coat layer or a second oxide layer can be disposed between the elastomer layer and the energy-dispersing layer. Alternatively, a second hard coat layer or a second oxide layer can be disposed between the elastomer layer and the structural layer. In addition, a third hard coat layer or a third oxide layer can be further disposed between the elastomer layer and the first energy-dispersing layer.

In one embodiment, a cover window assembly having a first energy-dispersing layer, a structural layer disposed on the first energy-dispersing layer and a first hard coat layer or a first oxide layer disposed on the structural layer can further comprise a second hard coat layer or a second oxide layer disposed on the first energy dispersing layer and a second energy-dispersing layer disposed on the second hard coat layer or the second oxide layer.

Many combinations and various arrangements of an energy-dispersing layer, a structural layer, an elastomer layer, a hard coat layer, an oxide layer and an adhesive layer can be used to make cover window assemblies of the present invention. For example, a cover window assembly can comprise (a) an energy-dispersing layer; (b) an adhesive layer disposed on the energy-dispersing layer; (c) a first hard coat layer or a first oxide layer disposed on the adhesive layer; (d) a structural disposed on the first hard coat layer or the first oxide layer; and (e) a second hard coat layer or a second oxide layer disposed on the structural layer.

In one embodiment, a cover window assembly can also comprise (a) an energy-dispersing layer; (b) a first hard coat layer or a first oxide layer disposed on the energy-dispersing layer; (c) an adhesive layer disposed on the first hard coat layer or the first oxide layer; (d) a second hard coat layer or a second oxide layer disposed on the adhesive layer; (e) a structural layer disposed on the second hard layer or the second oxide layer; and (f) a third oxide layer disposed on the structural layer.

In some embodiments, a cover window assembly can comprise a set of multi-layers adhered to an energy-dispersing layer by an adhesive layer. In one embodiment, the set of multi-layers comprises an elastomer layer, a structural layer disposed on the elastomer layer and a hard coat layer or an oxide layer disposed on the structural layer. In another embodiment, the set of multi-layer comprises an elastomer layer and a sandwich layer of two hard coat layers or two oxide layers sandwiched with a structural layer disposed on an elastomer layer. In yet another embodiment, the set of multi-layer comprises an elastomer layer, an energy-dispersing layer disposed on the elastomer layer and a sandwich layer of two hard coat layers or two oxide layers sandwiched with a structural layer disposed on the energy-dispersing layer.

In some embodiments, a cover window assembly can comprise a set of multi-layers adhered to an elastomer layer by an adhesive layer. In one embodiment, the set of multi-layers comprises an energy-dispersing layer, a structural layer disposed on the energy-dispersing layer, and a hard coat layer or an oxide layer disposed on the structural layer.

In some embodiments, a cover window can comprise a first set of multi-layers, a second set of multi-layers and an adhesive layer is adhered to the first and the second sets of the multi-layers. The first set of multi-layers can be a sandwich layer comprising two hard coat layers or two oxide layers sandwiched by a structural layer. In one embodiment, the second set of multi-layers comprises an energy-dispersing layer and a hard coat layer or an oxide layer disposed on the energy-dispersing layer. The adhesive layer is disposed between the hard coat layers or the oxide layers of the first and the second sets of multi-layers.

In another embodiment, the second set of multi-layers comprises an elastomer layer disposed and an energy-dispersing layer disposed on the elastomer structural layer. In yet another embodiment, the second set of multi-layers comprises an energy-dispersing layer and a structural layer disposed on the energy-dispersing layer. In yet another embodiment, the second set of multi-layers comprises an energy-dispersing layer, a structural layer disposed on the energy-dispersing layer and an oxide layer disposed on the structural layer. The adhesive layer is disposed between the hard coat layer or the oxide layer of the first set of multi-layers and the oxide layer of the second set of multi-layers.

In some embodiments, a cover window assembly can comprise a first set of multi-layers adhered to a second set of multi-layers by an adhesive layer. In one embodiment, the first set of multi-layers comprises an elastomer layer and a sandwich layer of two hard coat layers or two oxide layers sandwiched with a structural layer disposed on the elastomer layer; and the second set of multi-layers comprises an energy-dispersing layer and a structural layer disposed on the energy-dispersing layer. The adhesive layer is disposed between the elastomer layer of the first set of multi-layers and the structural layer of the second set of multi-layers. Furthermore, a hard coat layer or an oxide layer can be disposed on the structural layer of the second set of multi-layers. Alternatively, the second set of multi-layers comprises an energy-dispersing layer and a hard coat or an oxide layer disposed on the energy-dispersing layer. The adhesive layer is disposed between the elastomer layers of the first set of multi-layers and the hard coat layer or the oxide layer of the second set of multi-layers.

In another embodiment, the first set of multi-layers comprises a structural layer, a hard coat layer disposed on the structural layer and an oxide layer disposed on the hard coat layer; and the second set of multi-layer comprises an energy-dispersing layer and an elastomer layer disposed on the energy-dispersing layer.

In some embodiments, a cover window can comprise a first set of multi-layers, a second set of multi-layers and a third set of multi-layers, wherein the first set and second set of multi-layers are adhered together by a first adhesive layer and the second and the third set of multi-layers are adhered together by a second adhesive layer. In one embodiment, the first set of multi-layers comprises an energy-dispersing layer, a hard coat layer or an oxide layer disposed on the energy-dispersing layer; the second set of multi-layers comprises an energy-dispersing layer, a hard coat layer or an oxide layer disposed on the energy-dispersing layer; and a third set of multi-layer comprises a sandwich layer of two hard coat layers or two oxide layers sandwiched with a structural layer. The adhesive layers are disposed between the hard coat or oxide layers of the three sets of multi-layers.

At least one primer layer can optionally be included between any two layers in the cover window assembly described above. Other layers including an anti-fingerprint coating (AF) layer, an anti-reflection coating (AR) layer, and an anti-glare coating (AG) layer can also be added on the top of the cover window assembly. The cover window assembly of the present invention has a total thickness of at least 110 μm, or at least 130 μm, or at least 140 μm, or at least 150 μm, or at least 200 μm, or at least 250 μm, or at least 300 μm, or at least 350 μm, or at least 400 μm, or at least 450 μm, or at least 500 μm or at least 550 μm, or at least 600 μm.

An interlaminar fracture toughness of any interface in the cover window assembly described above can be at least 100 $J/m^2$, or at least 200 $J/m^2$, or at least 350 $J/m^2$. The interlaminar fracture toughness can be measured with a double-cantilever beam test. The test uses a 1"×6" multilayer film specimen. This specimen is adhered top and bottom with 1"×6" aluminum backing bars to limit the sample deflection under load, and to attach to loading blocks. The result is a sandwich as follows: A1 bar/'A' Layer/'B' layer/'A' layer/A1 bar. Then, loading blocks are attached to the aluminum backing bars top and bottom. The samples can be tested in an ElectroForce 1000 load frame equipped with a 1000 lb load cell. The test purposefully creates an initial crack between the weakest layers and propagates that crack along the interface while measuring the transverse load, the opening displacement, and the crack length along the specimen long axis. If the crack can be easily created, the interfacial adhesion is low or modest and the interlaminar fracture toughness can be measured. If the crack cannot be created, the interlaminar adhesion is high, or is not adhesion at all, but instead consolidation. A fully consolidated tri-layer stack should not be able to be separated. The locus of failure should be elsewhere.

The cover window assembly of the present invention is transparent and colorless. Optical properties of the cover window assembly (transmittance, haze, yellowness index and b*) can be measured with a BYK Haze Gard Plus instrument (commercially available from BYK-Gardner GmbH, Germany). Yellowness index can be calculated based on the absorbance spectrum between 395 and 700 nm using a Perkins Elmer Lamba 550-UV spectrometer (commercially available from PerkinElmer Inc., Waltham, Massachusetts). b* (which correlates to the perceived degree of yellowing) can be calculated based on % Transmittance between 380 to 780 nm, with 10 degree viewing angle and D65 daylight illuminant.

The cover window assembly may have a haze value of 5% or less, or 3% or less, or 2% or less, or 1% or less. The cover window assembly can have a transmittance of at least 80%, or at least 85%, or at least 90%, or at least 93%, or at least 95%, or at least 98%, or at least 99%. The cover window may have yellow index or b* value less than 1.

Ball drop testing can reveal wide ranges of impact damage resistance of a cover window assembly. In the present invention, a ball drop testing is used to evaluate the impact resistance of a cover window assembly for protecting a 1 mm thick glass. The cover window assembly of the present invention is adhered to a 1 mm thick glass using a 25 μm OCA for the ball drop testing. A 32.7 grams ball having a diameter of about 20 mm can be used for the ball drop testing. A height from which a ball is dropped is recorded. A cover window assembly can have a height of at least 10 mm, or at least 20 mm, or at least 50 mm, or at least 100 mm, or at least 150 mm, or at least 200 mm, or at least 250 mm, or at least 300 mm, or at least 350 mm, or at least 400 mm for 60% probability of glass failure. In one embodiment, the cover window assembly has at least 60% or at least 80% glass survival rate when subjected to a ball drop testing with a 32.7 g stainless steel ball from a height of 10 mm.

Dart drop testing can also reveal wide ranges of impact damage resistance. In this test, a dart drop testing is also used to evaluate the impact resistance of a cover window assembly for protecting 1 mm thick glass. The cover window assembly of the present invention is adhered to a 1 mm thick glass using a 25 μm OCA for the dart drop test. A dart has a total weight of 5 or 12 grams with a tip having an diameter of about 1 mm. A cover window assembly can have a height of at least 5 mm, or at least 10 mm, or at least 50 mm, or at least 100 mm, or at least 150 mm, or at least 200 mm, or at least 250 mm, or at least 300 mm, or at least 350 mm, or at least 400 mm for 60% probability of glass failure.

Pencil hardness testing can reveal wide ranges of surface damage resistance. The pencil hardness testing of a cover window assembly is conducted based on ASTM DD3363. The cover window assembly can have a standardized pencil hardness of at least 6B, or at least 3B, or at least HB, or at least 1H, or at least 2H, or at least 3H, or at least 4H, or at least 5H, or at least 6H.

A cover window assembly of the present invention can be made by various processes depending on the specific layers in the cover window assembly. Each individual layer can be formed on a separate substrate by applying a coating composition of the layer on the substrate, polymerizing and curing the composition under suitable conditions, and peeling off the layer from the substrate. Each individual layer can also be formed by extrusion. The formed layers can be laminated using adhesive layer(s) and/or elastomer layer(s) to make a cover window assembly.

The cover window assembly of the present invention can be applied to a variety of articles, including wind shields, displays on electronic devices. In one embodiment, the article can be a flexible display. The cover window assembly can be disposed on a flexible display panel or module and can be adhered to the display panel or module by the adhesive layer. The adhesive layer is the same as those described previously.

A cover window assembly can also be made by co-extrusion of multi-layer polymers. Alternatively, a cover window assembly can also be made by coating polymerizable and curable compositions layer by layer on a separate substrate. Alternatively, a cover window can be made using mixed coating and laminating methods.

The present invention also relates to a display device comprising the cover window assembly described above. In one embodiment, the display device is a flexible display device. An exemplary embodiment of the present invention provides the flexible display device comprising a flexible display module, a lower module and the cover window assembly described above. The flexible display module can include a folding area and a peripheral area disposed adjacent to the folding area. The cover window assembly having a multi-layer of polymeric films overlaps the peripheral area and is easily folded in the folding area of the flexible display device.

The flexible display device may further comprise a touch screen and a polarizing plate between the surface of the flexible display panel and the cover window assembly.

EXAMPLES

Preparation of Coating Compositions and Films
Polyimide Film—PI
12.837 kg of trifluromethylbenzidine (TFMB, Seika Corporation, Wakayam Seika Kogyo Co., LTD., Japan) and 107.5 kg of dimethyl acetamide (DMAC) were added to a nitrogen purged 80-gallon reactor while stirring. The solution was stirred to completely dissolve the TFMB in the DMAC solvent, and stirring continuing during all subsequent steps. The reaction mixture was heated to ~40° C. 1.11 kg of biphenyl tetracarboxylic acid dianhydride (BPDA, Mitsubishi Chemical Company, Japan) and 15.079 kg of 4,4'-(hexafluoroisopropylidene)diphthalic anhydride (6FDA, Synasia, Metuchen, NJ) were added in four separate aliquots over a 6 hours period. Three additional aliquots of 1.831 g of BPDA and 24.881 g of 6FDA were added to the reaction mixture over a period of ~3 hours. The viscosity of the pre-polymer was ~89 poise at 25° C. A portion of the polymer was polymerized ("finished") to ~1200-1300 poise using a mixture of 6 wt % pyromellitic dianhydride in DMAC in a nitrogen purged reactor. The material was polymerized with the PMDA solution over the course of ~24 hours at 40° C. to form a polyamic acid solution.

The polyamic acid solution was cast onto a moving belt and was dried at an oven temperature in a range of from about 95 to about 150° C. The self-supporting film was peeled from the belt and heated with radiant heaters in a tenter oven at a temperature of from about 110 to about 675° C. (radiant heater surface temperature) to dry and imidize the polymer film. A 50 μm PI film was obtained.

Polyethylene Terephthalate (PET) Film—PET
A 50 μm PET film was obtained from Tekra (Melinex® 462 of DuPont Teijin Films™).

Optical Clear Adhesive Film—OCA
A 25 μm OCA film (3M™ Optically Clear Adhesives 8211) was obtained from APD Inc.

Hard Coat Liquid Formulation—P1
The formulation was prepared by mixing PC-2000HV (27.5 parts per weight, Polyset Co. Inc.), silica nanoparticles YSE-AY4 (30.5 parts per weight, Admatechs Oc. Ltd.), bis(7-oxabicyclo[4.1.0]heptan-3-ylmethyl) adipate (3 parts per weight, Matrix Scientific), diisopropyl ketone (34.2 parts per weight, Sigma-Aldrich), propylene glycol methyl ether (3.8 parts per weight, Sigma-Aldrich), BYK-307 (0.1 parts per weight, BYK USA Inc.), Tinuvin® 1600 (0.2 parts per weight, BASF), and CPI-310FG (0.6 parts per weight, San Apro Ltd., Japan), followed by filtration (pore size 1.0 μm, Whatman™).

Hard Coat Liquid Formulation—P2
The formulation was prepared by mixing Ebecryl™ 8602 (45 parts per weight, Allnex), Photomer® 4356 (20 parts per weight, IGM Resins), Sartomer SR399 (15 parts per weight, Arkema), Ebercryl™ LED 02 (15 parts per weight, Allnex), Esacure KTO 46 (5 parts per weight, IGM Resins) in propylene glycol methyl ether acetate (166.67 parts per weight, Sigma-Aldrich). The resulting mixture was filtered (pore size 0.2 μm, Whatman™), and then OPTOOL DAC-HP (1 part per weight, Daikin Industries, Ltd.) and NANOBYK-3601 (1 part per weight, BYK USA Inc.) were added, followed by filtration (pore size 1.0 μm, Whatman™). The final formulation concentration range was adjusted to 20 to 60 wt % solids through further dilution with either propylene glycol methyl ether acetate (Sigma-Aldrich), methyl isobutyl ketone (Sigma-Aldrich), or 2-pentanone (Sigma-Aldrich).

Urethane Acrylate Liquid Formulation—E5
The formulation was prepared by mixing 39.7 g of Ebecryl™ 230 and 39.7 g of Ebecryl™ 130 (commercially available from Allnex); 2.5 g of Omnirad™ 4265, 1.3 g of Omnirad™ 819 and 1.3 g of Omnirad™ 184 (commercially available from IGM Resin); 4.2 g of trimethylolpropane triacrylate (TMPTA); 4.2 g of Jeffamine® T403 (commercially available from Huntsman); 7.1 g of methyl isobutyl ketone (MIBK); and 0.2 g of Omnistab IC (commercially available from IGM Resin) to obtain homogeneous liquid formulation.

Preparation of Cover Window Assembly

Example 1

P2 was coated on the 50 μm PET film in an nRad slot die coater (nTact) using a shim thickness of 2 mil at a coating speed of ~30 mm/s and a coating flow rate of 30-200 uL/s. Subsequently the coating, solvents were removed at 90° C., followed by curing a dried film in a Fusion F300S UV curing system (Heraeus Noblelight America LLC) equipped with a D bulb lamp and using a belt speed of ~50 ft/min. Multiple passes under the UV curing system were used to reach a UV dosage of 2,000-4,500 mJ/cm$^2$ to get a two-layer structure having a 5 μm P2 film on the 50 μm PET film shown as P2(5 μm)/PET(50 μm). Two of the two-layer structure P2(5 μm)/PET(50 μm) layers were then laminated with the 25 μm OCA film through a laminator model Catena 35 (GBC) with a copper-coated board support using a lamination gap of 3 mm, a roll speed setting of 5, and a lamination temperature of 90° F. to get a multi-layer structure shown as P2(5 μm)/PET(50 μm)/OCA(25 μm)/P2(5 μm)/PET(50 μm).

Example 2

A 50 μm E5 film was prepared by casting the liquid formulation E5 as prepared above on a PET substrate on an nRad slot die coater using a shim thickness of 4 mil at a coating speed of ~2 mm/s and a coating flow rate of 30-200 uL/s. Solvents of the formulation were removed using a soft bake process at 90° C. A Fusion UV curing system (F300S) with D bulb (radiation energy output from 100 to 440 nm) was used to cure and solidify the casted film. A belt/line speed of a UV conveyer was set to ~50 ft/min. Multiple passes on the UV conveyer were used to reach UV dosage of 2,000 to 4,500 mJ/cm² for sufficient curing. Next, the cured film was baked at 90° C. for 15 min to remove the residue solvents and un-reacted monomers. The film was then peeled off from the PET substrate to get the 50 μm E5 film.

A two-layer structure P2(5 μm)/PET(50 μm) was prepared as described in Example 1. A two-layer structure of a 5 μm P2 film on the 50 μm E5 film was prepared using the same procedure described in Example 1 except for replacing the PET film with the E5 film, shown as P2(5 μm)/PET(50 μm). The two-layer structure P2(5 μm)/PET(50 μm) were then laminated with the 25 μm OCA film on the top of the P2 film of the two-layer structure P2(5 μm)/E5(50 μm) through a laminator model Catena 35 (GBC) with a copper-coated board support using a lamination gap of 3 mm, a roll speed setting of 5, and a lamination temperature of 90° F. to get a multi-layer structure shown as P2(5 μm)/PET(50 μm)/OCA (25 μm)/P2(5 μm)/E5(50 μm).

Example 3

A two-layer structure P2(5 μm)/PET(50 μm) and a two-layer structure P2(5 μm)/E5(50 μm) were prepared using the same procedures as those described in Examples 1 and 2, respectively. The lamination procedure was the same as Example 2 except for laminating the two-layer structure P2(5 μm)/E5(50 μm)/on the top of the P2 film of the two-layer structure P2(5 μm)/PET(50 μm) to get a multi-layer structure shown as P2(5 μm)/E5(50 μm)/OCA(25 μm)/P2(5 μm)/PET(50 μm).

Example 4

Two sets of a two-layer structure of 5 μm P2 film on the 50 μm PI film were prepared using the same procedure described in Example 1 except for replacing the PET film with the PI film shown as P2(5 μm)/PI(50 μm). The two sets the two-layer structure P2(5 μm)/PI(50 μm) were then laminated with the 25 μm OCA film though a laminator model Catena 35 (GBC) with a copper-coated board support using a lamination gap of 3 mm, a roll speed setting of 5, and a lamination temperature of 90° F. to get a multi-layer structure shown as P2(5 μm)/PI(50 μm)/OCA(25 μm)/P2(5 μm)/PI(50 μm).

Example 5

A two-layer structure P2(5 μm)/PI(50 μm) was prepared as described in Example 4 and a two-layer structure P2(5 μm)/E5(50 μm) was prepared as described in Example 2. The two-layer structure P2(5 μm)/PI(50 μm) was laminated on the top of the P2 film of the two-layer structure P2(5 μm)/E5(50 μm) using the 25 μm OCA film through a laminator model Catena 35 (GBC) with a copper-coated board support using a lamination gap of 3 mm, a roll speed setting of 5, and a lamination temperature of 90° F. to get a multi-layer structure shown as P2(5 μm)/PI(50 μm)/OCA(25 μm)/P2(5 μm)/E5(50 μm)

Example 6

A two-layer structure P2(5 μm)/E5(50 μm) and a two-layer structure P2(5 μm)/PI(50 μm) were prepared using the same procedures as those described in Examples 2 and 4, respectively. The lamination procedure was the same as Example 5 except for laminating the two-layer structure P2(5 μm)/E5(50 μm)/on the top of the P2 film of the two-layer structure P2(5 μm)/PI(50 μm) get a multi-layer structure shown as P2(5 μm)/E5(50 μm)/OCA(25 μm)/P2(5 μm)/PI(50 μm).

Example 7

A two-layer structure E5(50 μm)/PET (50 μm) was prepared based on the procedure described in Example 1 except for replacing P2 liquid formulation with E5 liquid formulation.

A two-layer structure P2(5 μm)/PET(50 μm) was prepared as described in Example 1. The P1 liquid formulation was coated on the PET film of the two-layer structure P2(5 μm)/PET(50 μm) using the same procedure as described in Example 1 except for replacing P2 liquid formulation with the P1 liquid formulation to get a 10 μm P1 on the top of PET film of the two-layer structure P2(5 μm)/PET(50 μm) to form a three-layer structure shown as P2(5 μm)/PET(50 μm)/P1(10 μm). The E5 liquid formulation was coated on the 10 μm P1 film of the three-layer structure using the same coating procedure as described in Example 1 to form a 50 μm E5 film on the top of the 10 μm P1 film. As a result, a four-layer structure shown as P2(5 μm)/PET(50 μm)/P1(10 μm)/E5(50 μm) was formed.

The PET film of the two-layer structure E5(50 μm)/PET (50 μm) were then laminated with the E5 film of the four-layer structure P2(5 μm)/PET(50 μm)/P1(10 μm)/E5(50 μm) using the 25 μm OCA film through a laminator model Catena 35 (GBC) with a copper-coated board support using a lamination gap of 3 mm, a roll speed setting of 5, and a lamination temperature of 90° F. to get a multi-layer structure shown as P2(5 μm)/PET(50 μm)/P1(10 μm)/E5(50 μm)/OCA(25 μm)/PET(50 μm)/E5(50 μm).

Example 8

A 100 μm E5 film was prepared using the same procedure as described in Example 2 except for casting twice amounts of the liquid formulation E5.

A 50 μm E5 film was prepared as described in Example 2. A four-layer structure P2(5 μm)/PET(50 μm)/P1(10 μm)/E5(50 μm) was prepared as described in Example 7 using the 50 μm E5 film.

The 100 μm E5 film were then laminated with the four-layer structure P2(5 μm)/PET(50 μm)/P1(10 μm)/E5(50 μm) with the 25 μm OCA film through a laminator model Catena 35 (GBC) with a copper-coated board support using a lamination gap of 3 mm, a roll speed setting of 5, and a lamination temperature of 90° F. to get a multi-layer structure shown as P2(5 μm)/PET(50 μm)/P1(10 μm)/E5(50 μm)/OCA(25 μm)/E5(100 μm).

Example 9

A four-layer structure P2(5 μm)/PET(50 μm)/P1(10 μm)/E5(50 μm) and a two-layer structure E5(50 μm)/PET(50 μm) were prepared as described in Example 7.

The E5 film of the two-layer structure E5(50 μm)/PET(50 μm) were then laminated with the E5 film of the four-layer structure P2(5 μm)/PET(50 μm)/P1(10 μm)/E5(50 μm) using the 25 μm OCA film through a laminator model Catena 35 (GBC) with a copper-coated board support using a lamination gap of 3 mm, a roll speed setting of 5, and a lamination temperature of 90° F. to get a multi-layer structure shown as P2(5 μm)/PET(50 μm)/P1(10 μm)/E5(50 μm)/OCA(25 μm)/E5(50 μm)/PET(50 μm).

Example 10

A four-layer structure P2(5 μm)/PI(50 μm)/P1(10 μm)/E5(50 μm) was prepared as described in Example 7 except for replacing the 50 μm PET film with the 50 μm PI film. A two-layer structure E5(50 μm)/PI(50 μm) was prepared as described in Example 7 except for replacing the 50 μm PET film with the 50 μm PI film.

The PI film of the two-layer structure E5(50 μm)/PI(50 μm) were then laminated with the E5 film of the four-layer structure P2(5 μm)/PI(50 μm)/P1(10 μm)/E5(50 μm) using the 25 μm OCA film through a laminator model Catena 35 (GBC) with a copper-coated board support using a lamination gap of 3 mm, a roll speed setting of 5, and a lamination temperature of 90° F. to get a multi-layer structure shown as P2(5 μm)/PI(50 μm)/P1(10 μm)/E5(50 μm)/OCA(25 μm)/PI(50 μm)/E5(50 μm).

Example 11

A four-layer structure P2(5 μm)/PI(50 μm)/P1(10 μm)/E5(50 μm) was prepared as described in Example 10.
A 100 μm E5 film was prepared as described in Example 8.

The 100 μm E5 film were then laminated with the E5 film of the four-layer structure P2(5 μm)/PI(50 μm)/P1(10 μm)/E5(50 μm) with the 25 μm OCA film through a laminator model Catena 35 (GBC) with a copper-coated board support using a lamination gap of 3 mm, a roll speed setting of 5, and a lamination temperature of 90° F. to get a multi-layer structure shown as P2(5 μm)/PI(50 μm)/P1(10 μm)/E5(50 μm)/OCA(25 μm)/E5(100 μm).

Example 12

A four-layer structure P2(5 μm)/PI(50 μm)/P1(10 μm)/E5(50 μm) was prepared as described in Example 7, and a two-layer structure E5(50 μm)/PI(50 μm) was prepared as described in Example 10.

The 50 μm E5 film of the two-layer structure E5(50 μm)/PI(50 μm) were then laminated with the E5 film of the four-layer structure P2(5 μm)/PI(50 μm)/P1(10 μm)/E5(50 μm) using the 25 μm OCA film through a laminator model Catena 35 (GBC) with a copper-coated board support using a lamination gap of 3 mm, a roll speed setting of 5, and a lamination temperature of 90° F. to get a multi-layer structure shown as P2(5 μm)/PI(50 μm)/P1(10 μm)/E5(50 μm)/OCA(25 μm)/E5(50 μm)/PI(50 μm).

Mechanical Characterizations of Cover Window Assembly

Ball Drop Testing Method—Ball drop testing was conducted to evaluate the impact resistance of a cover window assembly for protecting a 1 mm thick glass. A cover window assembly sample was adhered to a 1 mm thick micro-slide glass (1 in×3 in) using the 25 μm OCA film to form a test stack. The test stack was placed on a 3-inch thick polished granite. A 32.7 grams stainless steel ball with a diameter about 20 mm was dropped from different heights to evaluate the effectiveness of cover windows for protecting 1 mm thick glass. The impact performance of glass is highly governed by the flaw size and flaw distribution Therefore, 20 drops were conducted at each height to develop the probability of failure at different heights and 60% failure rate was recorded as the characteristic failure rate for each test stack for comparison. Table 1 shows the heights of 60% failure of the glass; and the stack having the cover window assemblies of Examples 1-12, the adhesive film and the glass.

TABLE 1

Ball Drop Testing Results

| | | Height at 60% Failure (mm) | |
|---|---|---|---|
| Example | Multi-Layer Composition | Glass | CW/Glass |
| 1 | P2(5 μm)/PET(50 μm)/OCA(25 μm)/P2(5 μm)/PET(50 μm) | 26.68 | 93.3 |
| 2 | P2(5 μm)/PET(50 μm)/OCA(25 μm)/P2(5 μm)/E5(50 μm) | | 112.5 |
| 3 | P2(5 μm)/E5(50 μm)/OCA(25 μm)/P2(5 μm)/PI(50 μm) | | 107.2 |
| 4 | P2(5 μm)/PI(50 μm)/OCA(25 μm)/P2(5 μm)/PI(50 μm) | | 101.7 |
| 5 | P2(5 μm)/PI(50 μm)/OCA(25 μm)/P2(5 μm)/E5(50 μm) | | 107.7 |
| 6 | P2(5 μm)/E5(50 μm)/OCA(25 μm)/P2(5 μm)/PI(50 μm) | | 99.6 |
| 7 | P2(5 μm)/PET(50 μm)/P1(10 μm)/E5(50 μm)/OCA(25 μm)/PET(50 μm)/E5(50 μm) | 44.4 | 202.9 |
| 8 | P2(5 μm)/PET(50 μm)/P1(10 μm)/E5(50 μm)/OCA(25 μm)/E5(100 μm) | | 260.9 |
| 9 | P2(5 μm)/PET(50 μm)/P1(10 μm)/E5(50 μm)/OCA(25 μm)/E5(5 μm)/PET(50 μm) | | 281.4 |
| 10 | P2(5 μm)/PI(50 μm)/P1(10 μm)/E5(50 μm)/OCA(25 μm)/PI(50 μm)/E5(50 μm) | | 219 |
| 11 | P2(5 μm)/PI(50 μm)/P1(10 μm)/E5(50 μm)/OCA(25 μm)/E5(100 μm) | | 287 |
| 12 | P2(5 μm)/PI(50 μm)/P1(10 μm)/E5(50 μm)/OCA(25 μm)/E5(50 μm)/PI(50 μm) | | 293.8 |

What is claimed is:

1. A cover window assembly comprising a first energy-dispersing layer having an elastic modulus greater than 0.5 GPa and a yield stress less than 110 MPa; a first hard coat layer or a first oxide layer disposed directly on a top or a bottom surface of the first energy-dispersing layer; an adhesive layer directly disposed on the first energy-dispersing layer; a second hard coat layer or a second oxide layer disposed directly on the adhesive layer; and a structural layer having a yield stress higher than the yield stress of the first energy-dispersing layer and an elastic modulus of least 3 GPa, and disposed directly on the second hard coat layer or the second oxide layer.

2. A display device comprising an upper module comprising the cover window assembly of claim 1, a display module and a lower module.

3. A cover window assembly comprising a first energy-dispersing layer having an elastic modulus greater than 0.5 GPa and a yield stress less than 110 MPa; a first hard coat layer or a first oxide layer disposed directly on a top or a bottom surface of the first energy-dispersing layer; a first structural layer having a yield stress higher than the yield stress of the first energy-dispersing layer and an elastic modulus of least 3 GPa, and disposed directly on the first hard coat layer or the first oxide layer; a second hard coat layer or a second oxide layer disposed directly on the first structural layer; an adhesive layer disposed directly on the first energy-dispersing layer; and a second energy-dispersing layer having an elastic modulus greater than 0.05 GPa and a yield stress less than 110 MPa, and disposed directly on the adhesive layer.

4. The cover window assembly of claim 3, further comprising a second structural layer having a yield stress higher than the yield stress of the second energy-dispersing layer and an elastic modulus of least 3 GPa, and disposed between the adhesive layer and the second energy-dispersing layer.

5. The cover window assembly of claim 3, further comprising a second structural layer having a yield stress higher than the yield stress of the second energy-dispersing layer and an elastic modulus of least 3 GPa, and disposed directly on the second energy-dispersing layer.

6. A display device comprising an upper module comprising the cover window assembly of claim 3, a display module and a lower module.

7. A cover window assembly comprising a first energy-dispersing layer having an elastic modulus greater than 0.5 GPa and a yield stress less than 110 MPa; a first hard coat layer or a first oxide layer disposed directly on a top or a bottom surface of the first energy-dispersing layer; a first structural layer having a yield stress higher than the yield stress of the first energy-dispersing layer and an elastic modulus of least 3 GPa, and disposed directly on the first hard coat layer or the first oxide layer; a second hard coat layer or a second oxide layer disposed directly on the first structural layer; and a second structural layer having a yield stress higher than the yield stress of the first energy-dispersing layer and an elastic modulus of least 3 GPa, and disposed directly on the first energy-dispersing layer.

8. A display device comprising an upper module comprising the cover window assembly of claim 7, a display module and a lower module.

9. A cover window assembly comprising a first energy-dispersing layer having an elastic modulus greater than 0.5 GPa and a yield stress less than 110 MPa; a first structural layer having a yield stress higher than the yield stress of the first energy-dispersing layer and an elastic modulus of least 3 GPa, and disposed directly on a top surface or a bottom surface of the first energy-dispersing layer; a first hard coat layer or a first oxide layer disposed directly on the first structural layer; a second hard coat layer or a second oxide layer disposed directly on the first energy-dispersing layer; and a second energy-dispersing layer having an elastic modulus greater than 0.05 GPa and a yield stress less than 110 MPa, and disposed directly on the second hard coat layer or the second oxide layer.

10. A display device comprising an upper module comprising the cover window assembly of claim 9, a display module and a lower module.

11. A cover window assembly comprising a first energy-dispersing layer having an elastic modulus greater than 0.5 GPa and a yield stress less than 110 MPa; a first structural layer having a yield stress higher than the yield stress of the first energy-dispersing layer and an elastic modulus of least 3 GPa, and disposed directly on a top surface or a bottom surface of the first energy-dispersing layer; a first hard coat layer or a first oxide layer disposed directly on the first structural layer; and an elastomer layer having an elastic modulus of at least 1 MPa and a Poisson's ratio of at least 0.4, and disposed directly on the first energy-dispersing layer.

12. A display device comprising an upper module comprising the cover window assembly of claim 11, a display module and a lower module.

13. A cover window assembly comprising: (a) an energy-dispersing layer having an elastic modulus greater than 0.5 GPa and a yield stress less than 110 MPa; (b) an adhesive layer disposed directly on the energy-dispersing layer; (c) a first hard coat layer or a first oxide layer disposed directly on the adhesive layer; (d) a structural layer disposed directly on the first hard coat layer or the first oxide layer; and (e) a second hard coat layer or a second oxide layer disposed directly on the structural layer.

14. A display device comprising an upper module comprising the cover window assembly of claim 13, a display module and a lower module.

* * * * *